Jan. 21, 1969   J. G. MILNER   3,423,130
EVACUATION APPARATUS
Filed Dec. 7, 1966   Sheet 1 of 2
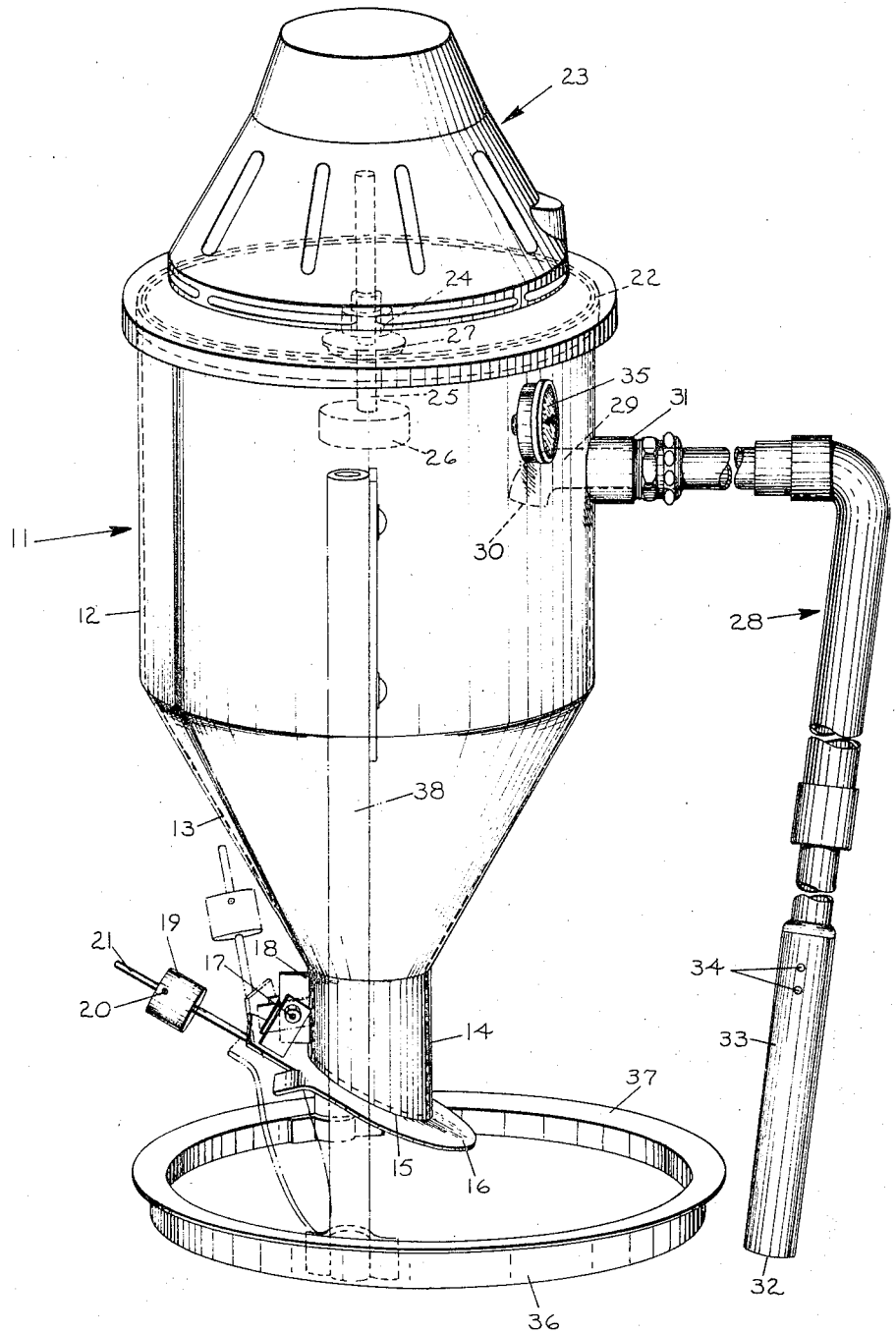
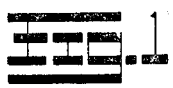
INVENTOR.
JAMES G. MILNER
BY
Albert A. Maharrel
ATTORNEY

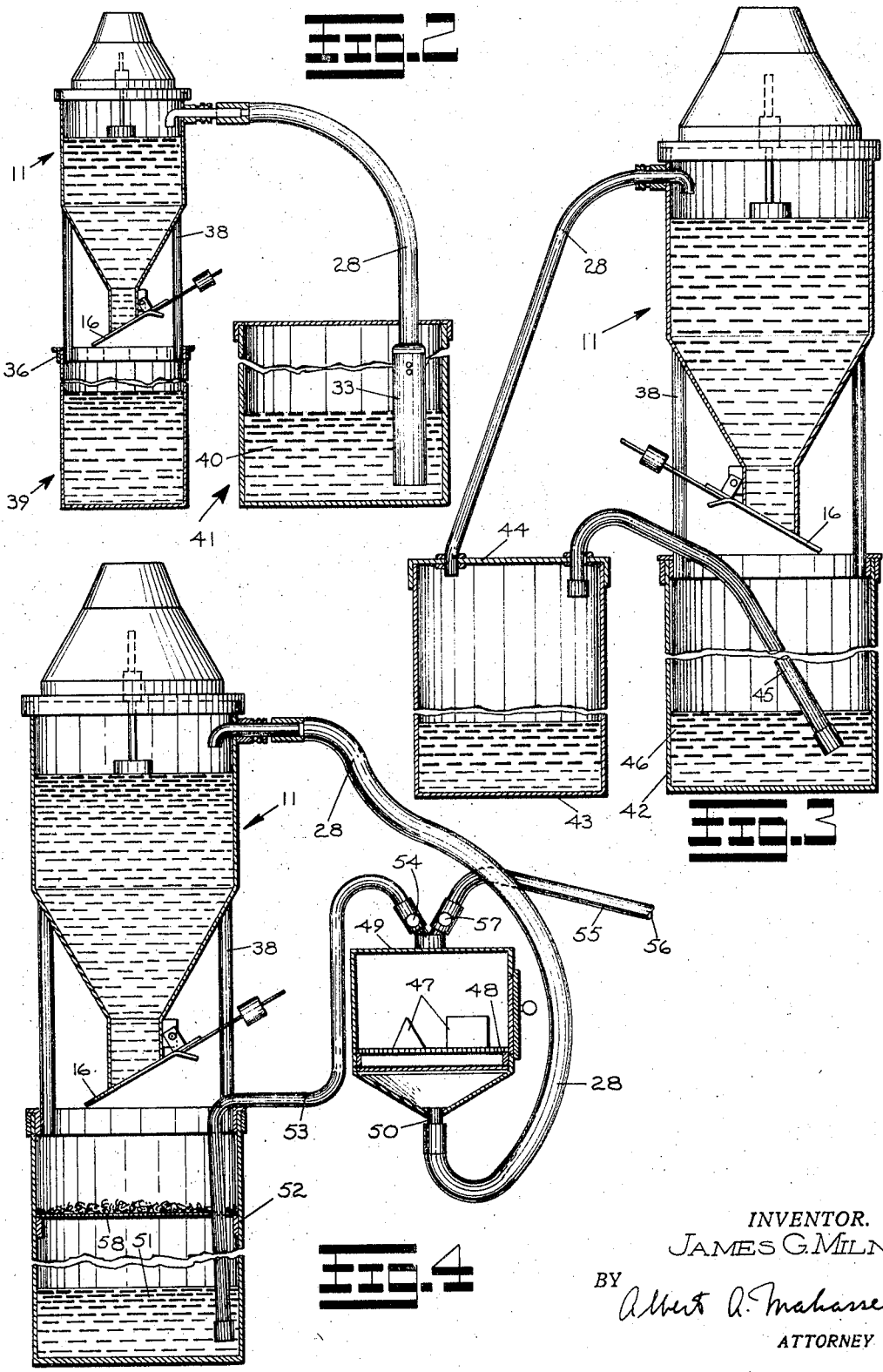

United States Patent Office 3,423,130
Patented Jan. 21, 1969

3,423,130
EVACUATION APPARATUS
James G. Milner, 60 Fales St.,
Worcester, Mass. 01606
Filed Dec. 7, 1966, Ser. No. 599,945
U.S. Cl. 302—14                2 Claims
Int. Cl. B65g 53/30, 53/40

ABSTRACT OF THE DISCLOSURE

An apparatus for the transfer of liquids and solids from one container or area to another. A hopper shaped tank is completely closed and includes a suction inducing device, an entry hose, a discharge valve, and a level indicator which returns the tank to atmospheric pressure to permit the discharge valve to open automatically when the contents reach a predetermined level.

Background of the invention

Various devices are known for effecting transfer of materials from one container into another by a vacuum process. United States Patent No. 2,317,589 is typical of such an apparatus. It is desirable in certain applications to transfer the material from a first tank or container, then to a holding or transfer tank, and finally to a third or processing tank, and to do this in some automatic sequence as controlled, for example, by the content level in the transfer tank.

In the apparatus of the above cited patent liquids may be transferred from a first receptacle to a second transfer receptacle only, a float being provided for closing the suction line to control the quantity of removed liquid. No provision is made for the subsequent transfer of the liquid from the transfer receptacle to still another receptacle, which is desirable in many industrial applications. For example, in the case of grinding machines it is necessary periodically to remove the liquid coolant and to clean out residual solids which accumulate from the grinding operation. This is a very tedious task and sometimes necessitate shutting down the grinding operation for substantially long periods of time to facilitate the cleaning.

A need also exists for a transfer vehicle which will enable the transfer of liquids and/or solids from a large holding tank or storage area into smaller storage units in measured quantities, all very quickly and in a simplified manner without necessitating elaborate and expensive equipment.

Summary of the invention

The instant invention relates to a transfer vehicle which serves to effect the removal of liquids and/or solids from one container or area and also to permit the automatic discharge thereof into another container. The latter container may serve any one of a number of purposes. It may be a tank which is to be filled with a predetermined quantity of liquids or solids. Alternatively, it may be a treatment tank wherein some product is being processed by the passage of the transferred liquid to come into contact with or to be admixed with that product. Further, it may be a separating tank wherein, for example, the solids, may be removed from the liquids and the latter then recycled to the first container from which they were originally removed.

The invention generally comprises a tank which is preferably cylindrical in form and is hopper shaped at its lower end which includes a counterbalanced discharge valve. The top of the tank is enclosed by a cover which includes a vacuum producing device and a central port which in the preferred embodiment may be closed off from the tank interior by means of a float valve to allow the tank to return to atmospheric pressure and thus permit the weight of the accumulated material automatically to open the discharge valve whereby that material will under the force of gravity be discharged from the transfer tank into some other tank for storage or other processing. A flexible conduit has one end connected to the tank interior and its other end is insertable into the container or area from which it is desired to withdraw material.

Various specific applications of the transfer tank and the particular advantages attendant thereto will be described in the detailed description to follow and from which numerous other uses will be come apparent.

Brief description of the drawings

FIG. 1 is an elevation view somewhat in perspective of the transfer tank and including one type of a mount which may be used therewith;

FIG. 2 is a schematic illustration of the transfer tank as it would be utilized in the transfer of material from one location to another;

FIG. 3 is a schematic view of the tank as it would be utilized in the filling of drums with material from a larger container; and FIG. 4 is a schematic view of the tank illustrating its use in the cyclic treatment or processing of solids such as metal parts with liquids or gases.

Description of the preferred embodiment

In FIG. 1 the transfer tank is generally indicated by numeral 11 and comprises a cylindrical body portion 12 with a lower integral hopper or funnel shaped portion 13 and discharge spout 14 with an angularly directed outlet 15. The tank body is constructed of sheet metal of fairly heavy gauge capable of withstanding reduced pressures.

A discharge valve 16 in the form of a flat oval shaped plate is pivotally mounted at 17 to any suitable support 18 affixed to the discharge spout and in a manner whereby it is movable between a first sealingly engaged position with outlet 15 (shown in solid lines) and a second or lower discharge position (shown in dotted lines). A counterbalance 19 is adjustably positionable by means of a set screw 20 along an extension rod 21 attached to the underside of valve 16 and which projects in the opposite direction from the pivot. The counterbalance should be positioned so that valve 16 is closed or nearly closed when the tank is empty.

A cover 22 encloses the top of the tank and includes any suitable vacuum inducing device 23 for evacuating air from the tank. Communication between the tank interior and the vacuum device is by way of a centrally located relatively small opening 24 having coaxially mounted therethrough a stem 25 having a float 26 attached to its lower end and valve in the form of a flat disc 27 which is effective when the float is raised to close the opening 24 thereby to disconnect the vacuum source from the tank interior.

One type of vacuum inducing device which has been found to be particularly satisfactory is a model No. D1194 motor head manufactured by Mastercraft Industries Inc. of Paterson, N.J., and which is a motor operated vacuum generator in a self contained unit such as that shown at 23. Alternatively, two or more such generators may be used and mounted in the cover with individual floats and valves in each suction line, or with a single float and valve which is effective to seal all of the suction lines communicating between the tank and generators. Also, the vacuum device need not necessarily be mounted on the cover of the tank and can be an independent vacuum source with a flexible hose leading to an opening communicating with the tank interior.

A material entry tube is provided for the tank and is indicated by the arrow 28. One end 29 thereof projects into the tank and has a downwardly directed outlet at 30. The mounting of the tube to the tank is such as to permit angular adjustment of the outlet 30 and locking thereof in any desired position for reasons later to be explained. Tube 28 is flexible in all directions and has an open entry at 32 which is insertable into the container from which material is to be withdrawn. That end of the tube preferably includes a solid, cylindrical metal sleeve 33 to facilitate insertion into the material. A pair of ports 34 communicate with the tube interior and may be suitably baffled and serve to speed up the return of the pressure in the tank to atmospheric when float 26 has risen sufficiently to effect closing of opening 24, thereby to permit discharge of the tank contents through opening 15. A vacuum gauge 35 may optionally be provided to indicate pressure within the tank during operation.

The tank may conveniently be mounted on a rim 36 which may be of a size which is insertable into a 55 gallon drum, the flange 37 being adapted to overlie the drum top and thus to support the tank in suspended relation to the drum. Vertical supports 38 have one end attached to the rim and the other to the tank in any convenient manner.

In operation, the tank and its attached support may be mounted atop a 55 gallon drum or any other container or open area. The evacuating device 23 is put into operation and the metal sleeve 33 is inserted into the container or area from which solids and/or liquids are to be removed. The vacuum induced in the transfer tank will cause those solids and/or liquids to be drawn upwardly through entry tube 28 and to be deposited into the tank. The vacuum will be sufficient to hold valve 16 in a closed position. When the level in the tank is high enough to raise float 26 and thereby to close the opening 27, the tank interior will immediately return to atmospheric pressure aided by ports 34 and the weight of material on valve 16 will cause it to open to discharge that material.

In the case of liquids which contain substantial amounts of entrained solids which are likely to settle in the discharge spout and to bridge and thereby to prevent discharge from the tank, the outlet 30 should be adjusted so that it will discharge at a slight angle from the vertical. This deflection will cause a vortex and maintain the material in motion around the complete interior of the tank. The degree of deflection will also control the discharge rate of material from the tank. A slight angle will promote rapid and bulk discharge whereas an increased angle from the vertical will cause the fluids to spin faster to produce a larger air vortex and slower discharge rate. This becomes an important consideration when the process following the transfer tank must handle the material gradually or when there are some limitations in the subsequent processing operation.

The peripheral motion of the fluid resulting from the vortex action as it rises may be used to provide the necessary force to trigger some control or warning mechanism, such as, for example, to open a valve to introduce some additional material into the transfer tank either by the same entry tube or one or more additional tubes. A new mixture would be discharged from the tank when the level of the mixed materials reaches the float valve.

Certain industrial applications of the transfer tank will now be described. In FIG. 2 the tank is shown as mounted atop a receptacle 39 which may be a drum, for example. In this illustration it is desired to withdraw material 40 which may be a liquid, solid particles, or a mixture thereof, from receptacle 41 and to discharge that material into receptacle 39. The vacuum source is turned on and the sleeve 33 is inserted into the material 40 which will then be transferred into the receptacle 39 in the manner explained above. Receptacle 41 may be a coolant tank from a surface grinder, for example, whereby the solids would be separated out in receptacle 39 and the liquid returned to the coolant tank by gravity flow or any other convenient manner for further use in the grinding process.

FIG. 3 illustrates a process utilizing the transfer tank wherein the latter is acting as a vehicle for transferring materials from a larger container 42 directly into series of smaller containers, one of which is shown at 43. Container 43 in this case may be a drum which includes a cover 44 sealed to the top thereof. The lower end of tube 28 is in airtight engagement with one opening in that cover. A transfer conduit 45 also has one end in airtight engagement with a second opening in the cover and its other end is immersed in the liquid or other material 46 in the container 42. It will be obvious that when suction is applied in the transfer tank, material will be transferred via conduit 45 into container 43. When the latter is filled, the excess will flow through tube 28 into the transfer tank.

Still another application of the transfer tank is illustrated in FIG. 4. Here, it is desired to clean metal parts 47 with toxic or noxious liquids. The parts are supported on grid 48 in a completely enclosed container 49. Tube 28 is connected to an outlet 50 from the hopper shaped bottom of that container. The toxic liquid 51 is contained in a tank 52 above which the transfer tank 11 is supported. A transfer conduit 53 has one end immersed in liquid 51 and its other end is connected to discharge into the top of container 49 and over parts 47. A valve 54 is provided at this end of conduit 53. A further conduit 55 may have one end 56 connected to a hot or cold air supply and its opposite also connected into the top of container 49 which end is also provided with a valve 57.

Thus, with valve 57 closed and valve 54 open, as the vacuum is applied in the transfer tank, liquid 51 will be sprayed over the metal parts 47, which liquid will be recycled through tube 28 into tank 11 to be discharged into container 52. A screen 58 may be provided in the latter to filter out any solids. If it is then desired to dry the parts 47, it is only necessary to close valve 54 and open valve 57 to permit the air to be drawn through container 49.

The atmosphere of the room in which the cleaning tank is located is not contaminated and health hazards are eliminated. For example, container 49 may be located in a clean room or other controlled atmosphere area and the transfer tank may be located externally of the clean room whereby toxic or other such fluids may be used within the clean room without contaminating or taking air from that room as all supply and exhaust of air is external to the clean room.

Operation of the transfer tank can be automatically controlled in a simple manner if so desired. The motion of the discharge valve can be utilized to open and close a switch to affect operation of the vacuum generator. Controlled discharge rates of material from the transfer tank by the vortex action makes this possible as the discharge valve can be made to stay open for a sufficiently long time interval to permit the generator to be cut off and thus permit the tank contents to be discharged. When the tank is empty, the resetting action of the valve will recycle the vacuum generator. The entire assembly can be fully automated or fully cycled without the use of any timing devices or delicate sensing controls.

Also, the disc on the float valve can be adjustable to enable volumetric measurement and discharge.

While one embodiment of the invention has been disclosed, it is to be understood that the inventive concept may be carried out in a number of ways. The invention is therefore not to be limited to the precise details disclosed, but is intended to embrace all variations and modifications falling within the spirit of the invention and scope of the claims.

I claim:

1. A material transfer apparatus for conveying liquids and solids from one location to another which comprises (a) an enclosed transfer tank having a lower bottom portion and an outlet leading therefrom,
(b) a counterbalanced discharge valve pivotally mounted adjacent the lowermost end of said outlet and normally biased in the closed position,
(c) a vacuum source including a central opening communicating with the tank interior for inducing a vacuum therein and effective to maintain the valve in the closed position against the weight of the material in the tank,
(d) a level sensing device located internally of said tank and comprising a float centrally mounted in said opening, and a further valve responsive to upward movement of said float to close said opening, thereby to disconnect the flow of vacuum in the tank and to permit the weight of material to open the discharge valve, and
(e) a conduit having one end thereof connected to the interior of said tank, said one end being angularly adjustable, thereby to cause a vortex in the tank and to control the discharge rate of material from the tank.

2. A material transfer apparatus according to claim 1 wherein said discharge valve is an adjustable counterbalance.

References Cited

UNITED STATES PATENTS

| 2,308,365 | 1/1943 | Hornbrook | 302—59 |
| 3,273,943 | 9/1966 | Russell | 302—59 |

FOREIGN PATENTS

| 1,126,313 | 3/1962 | Germany. |

EVON C. BLUNK, *Primary Examiner.*

M. L. AJEMAN, *Assistant Examiner.*

U.S. Cl. X.R.

302—59